United States Patent
Lv et al.

(10) Patent No.: US 9,973,236 B2
(45) Date of Patent: May 15, 2018

(54) DEACTIVATION METHOD AND SYSTEM IN CROSSTALK SCENARIO

(71) Applicant: Huawei Technologies Co., Ltd., Shenzhen (CN)

(72) Inventors: Jie Lv, Wuhan (CN); Xiang Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 42 days.

(21) Appl. No.: 15/073,030

(22) Filed: Mar. 17, 2016

(65) Prior Publication Data
US 2016/0197646 A1 Jul. 7, 2016

Related U.S. Application Data

(63) Continuation of application No. PCT/CN2013/083792, filed on Sep. 18, 2013.

(51) Int. Cl.
*H04B 3/32* (2006.01)
*H04L 12/64* (2006.01)
(Continued)

(52) U.S. Cl.
CPC .............. *H04B 3/32* (2013.01); *H04L 12/64* (2013.01); *H04L 12/6418* (2013.01); *H04M 11/062* (2013.01); *H04B 3/487* (2015.01)

(58) Field of Classification Search
None
See application file for complete search history.

(56) References Cited

U.S. PATENT DOCUMENTS

| 2004/0233999 A1 | 11/2004 | Manstorfer et al. |
| 2009/0046568 A1 | 2/2009 | Xu |

(Continued)

FOREIGN PATENT DOCUMENTS

| CN | 101645841 A | 2/2010 |
| CN | 102224717 A | 10/2011 |

(Continued)

OTHER PUBLICATIONS

"Series G: Transmission Systems and Media, Digital Systems and Networks, Digital sections and digital line system—Metallic access networks, Very high speed digital subscriber line transceivers 2 (VDSL2) Amendment 4—European limit PSD mask B8-18 for band plan 998E17," ITU-T, G.993.2, Amendment 4, Aug. 2013, 30 pages.

(Continued)

*Primary Examiner* — Eunsook Choi
(74) *Attorney, Agent, or Firm* — Conley Rose, P.C.

(57) ABSTRACT

A deactivation method and system in a crosstalk scenario which relates to the field of mobile communications technologies. The method includes M transceivers of a central office end sending data using M lines, and when the M transceivers are in a data transmission showtime state, and when a trigger state change event is detected, switching, by N transceivers, to a deactivation execution state, to deactivate N lines among the M lines, acquiring an update coefficient used to update a crosstalk cancellation coefficient between active lines, updating the crosstalk cancellation coefficient between the active lines using the update coefficient, and controlling the transceivers in the deactivation execution state to enter a silent or an idle state.

21 Claims, 3 Drawing Sheets

---

When the M transceivers are in a data transmission showtime state, if a trigger state change event is detected, N transceivers switch to a deactivation execution state, to deactivate N lines among the M lines — 101

Acquire an update coefficient used to update a crosstalk cancellation coefficient between active lines, update the crosstalk cancellation coefficient between the active lines by using the update coefficient, and control the transceivers in the deactivation execution state to enter a silent or an idle state — 102

(51) Int. Cl.
*H04M 11/06* (2006.01)
*H04B 3/487* (2015.01)

(56) References Cited

U.S. PATENT DOCUMENTS

| | | | |
|---|---|---|---|
| 2010/0278222 | A1* | 11/2010 | De Lind Van Wijngaarden ....... H04M 11/062 375/220 |
| 2012/0195183 | A1* | 8/2012 | Nuzman ............... H04B 7/0848 370/201 |
| 2013/0235915 | A1 | 9/2013 | Wang et al. |
| 2014/0233710 | A1 | 8/2014 | Tu et al. |
| 2014/0254791 | A1* | 9/2014 | Wei ..................... H04M 11/062 379/406.01 |

FOREIGN PATENT DOCUMENTS

| | | |
|---|---|---|
| CN | 102422588 A | 4/2012 |
| CN | 102742172 A | 10/2012 |
| CN | 103067316 A | 4/2013 |
| EP | 2161879 A1 | 3/2010 |
| RU | 2313179 C2 | 12/2007 |
| WO | 2011152768 A1 | 12/2011 |
| WO | 2012102917 A1 | 8/2012 |
| WO | 2012167537 A1 | 12/2012 |
| WO | 2013015728 A1 | 1/2013 |

OTHER PUBLICATIONS

Alcatel-Lucent, "G.vector: Method to mitigate the impact of a disorderly leaving event," ITU, 08AB-068, Jun. 16-20, 2008, 6 pages.

Foreign Communication From a Counterpart Application, PCT Application No. PCT/CN2013/083792, English Translation of International Search Report dated Jun. 30, 2014, 2 pages.

Foreign Communication From a Counterpart Application, PCT Application No. PCT/CN2013/083792, English Translation of Written Opinion dated Jun. 30, 2014, 7 pages.

Foreign Communication From a Counterpart Application, Chinese Application No. 201380001413.5, Chinese Office Action dated Nov. 13, 2015, 7 pages.

Foreign Communication From a Counterpart Application, European Application No. 13893710.7, Extended European Search Report dated Jul. 27, 2016, 7 pages.

Foreign Communication From a Counterpart Application, Chinese Application No. 201380001413.5, Chinese Office Action dated Aug. 18, 2016, 6 pages.

Foreign Communication From a Counterpart Application, Chinese Application No. 201380001413.5, Chinese Search Report dated Aug. 10, 2016, 2 pages.

Foreign Communication From a Counterpart Application, Russian Application No. 22016114829, Russian Office Action dated Jul. 19, 2017, 6 pages.

Foreign Communication From a Counterpart Application, Russian Application No. 22016114829, English Translation of Russian Office Action dated Aug. 7, 2017, 3 pages.

"Series G: Transmission Systems and Media, Digital Systems and Networks, Digital sections and digital line system—Access networks, Self-FEXT cancellation (vectoring) for use with VDSL2 transceivers," ITU-T, G.993.5, Apr. 2010, 80 pages.

Foreign Communication From a Counterpart Application, European Application No. 17187625.3, Extended European Search Report dated Mar. 8, 2018, 8 pages.

\* cited by examiner

DEACTIVATION METHOD AND SYSTEM IN CROSSTALK SCENARIO

CROSS-REFERENCE TO RELATED APPLICATIONS

This application is a continuation of International Application No. PCT/CN2013/083792, filed on Sep. 18, 2013, which is hereby incorporated by reference in its entirety.

TECHNICAL FIELD

The present disclosure relates to the field of mobile communications technologies, and in particular, to a deactivation method and system in a crosstalk scenario.

BACKGROUND

A digital subscriber line (DSL) is a high-speed data transmission technology using a phone twisted pair for transmission. Gfast is the latest DSL technology, and is also referred to as a gigabit DSL. The technology uses a high frequency band of 100 megahertz (MHz) or even 200 MHz. In a high frequency band, a very serious crosstalk problem exists and needs to be resolved. Crosstalk includes near-end crosstalk (NEXT) and far-end crosstalk (FEXT).

Gfast uses a time division duplexing (TDD) technology such that upstream and downstream signals are sent at different time points, to eliminate an effect of NEXT, and uses a vectoring technology to eliminate an effect of FEXT.

A vectoring system includes a central office (CO) end (or a distribution point unit (DPU) end, where the CO end and the DPU end are subsequently collectively referred to as a CO end) and a far end. The CO end includes multiple (M) transceivers. The far end includes multiple (M) corresponding transceivers. During downstream transmission, the M transceivers of the central office end are used as transmit ends, the M transceivers of the far end are used as receive ends, and each transmit end corresponds to one receive end.

In a downstream direction, signals sent by transceivers of each CO end pass through a precoder before an inverse fast Fourier transform (IFFT) module. Most DSLs use a discrete multitone (DMT) modulation technology, and use a maximum of K subcarriers. Therefore, a signal of each office-end transceiver (the $m^{th}$ office-end transceiver) that has not passed through the precoder is $x_m$, which is a sequence including K subcarriers. A signal that is sent by the $m^{th}$ (m=1 to M) transceiver on the $k^{th}$ (k=1 to K) subcarrier and that has not passed through the precoder is marked as $x_m^k$, and a signal that is sent by the $m^{th}$ transceiver on the $k^{th}$ subcarrier and that has passed through the precoder is marked as $x_m^{'k}$. Signals that are sent by all the M transceivers on the $k^{th}$ subcarrier and that have not passed through the precoder are marked as $x^k$, and signals that are sent by all the M transceivers on the $k^{th}$ subcarrier and that have passed through the precoder are marked as $x^{'k}$, where $x^k$ and $x^{'k}$ are both vectors having M rows and one column, and the $m^{th}$ element of $x^k$ and the $m^{th}$ element of $x^{'k}$ are respectively $x_m^k$ and $x_m^{'k}$.

Therefore, on the $k^{th}$ subcarrier, a downstream signal transmission process may be expressed in a form of the following matrix: $x^{'k} = P^k x^k$ On the $k^{th}$ subcarrier, a received-signal vector $y^k$ of M twisted pairs may be expressed in a form of the following matrix: $y^k = Feq^k \cdot (H^k \cdot P^k \cdot x^k + \gamma^k)$. When $Feq^k \cdot H^k \cdot P^k$ is equal to an M*M unit matrix $I_M$, all crosstalk is canceled (a received signal of each line is only related to a signal of the line, and is unrelated to another signal), where $P^k$ is a precoding matrix on the $k^{th}$ subcarrier, and has a size of M*M, a module implementing a function of the precoding matrix is the precoder, and the module is also a module implementing a function of the vectoring system. $H^k$ is a channel matrix on the M twisted pairs on the $k^{th}$ subcarrier, and a size of the matrix is M*M. $Feq^k$ is a frequency domain equalizer (FEQ) matrix on the M twisted pairs on the $k^{th}$ subcarrier, the matrix has a size of M*M and is a diagonal matrix, a function of an FEQ is to restore a received signal to a sent signal, and a downstream FEQ is implemented in a transceiver xTU-R of the receive end, and a theoretical value of $Feq^k$ is a reciprocal of a diagonal of $H^k$, and $\gamma^k$ is a noise vector of M receivers on the $k^{th}$ subcarrier, and a size of the vector is M*1.

In an upstream direction, after a received-signal vector Y is processed using a cancellation matrix, a received signal Y' that has passed through the cancellation is generated. A formula may be expressed as $$y'^k = Feq^k \cdot W^k \cdot (H^k \cdot x^k + \gamma^k),$$

where $W^k$ is an upstream crosstalk cancellation matrix.

A method for acquiring the precoding matrix in an existing system is as follows. A pilot training signal is sent on a sync symbol, and a vectoring control entity (VCE) estimates the channel matrix $H^k$ or a normalized channel matrix $H_{eq}^k$ (the normalized channel matrix $H_{eq}^k$ is equal to $Feq^k \cdot H^k$, and is a matrix whose diagonals are all equal to 1) using the pilot. $H^k$ and $H_{eq}^k$ are collectively referred to as a channel matrix. A signal that is sent by a transceiver unit (TU) at the transmit end on the sync symbol is usually an orthogonal pilot sequence (PS) signal. Meanwhile, a TU at the receive end receives an error sample (ES). The channel matrix $H_{eq}^k$ may be estimated using the ES and the PS. After the channel matrix $H_{eq}^k$ is obtained through training, a cancellation matrix P or W, which is $H_{eq}^{k-1}$, is obtained using a method of inversion or approximate inversion. A module calculating the cancellation matrix is the VCE.

A description about a data symbol and a synchronization symbol of G.fast is as follows.

A data transmission unit of G. fast includes a symbol, a TDD frame and a superframe. In G. fast, sending is performed in an upstream-downstream time division manner. Each TDD frame has a length of 36 symbols, among which 35 data symbols are used to send upstream and downstream data in a time division manner. Therefore, there are a total of 35 upstream and downstream symbols. In each TDD frame, a former part is used to send downstream symbols, and a latter part is used to send upstream symbols. The other symbol is a gap between upstream sending and downstream sending, and is not used for sending a signal. Eight TDD frames form one superframe. Therefore, one superframe has a length of 288 symbols, among which there are 280 signal symbols. Among the 280 signal symbols, there is one upstream sync symbol and one downstream sync symbol, onto which only a PS or an online reconfiguration (OLR) control signal is modulated, and the other 278 signal symbols are data symbols, and are used to transmit user data.

Considering environmental protection and an energy consumption requirement of remote power supply, power consumption of a transceiver needs to be reduced as much as possible. Currently, in the DSL field, there is a discontinue mode for power saving (DMPS) technology. The main solution of the technology is that when there is no service data, a digital front end (DFE) processing module, an analog front end (AFE) processing module, and the like are turned off. The DFE processing module is, for example, a fast Fourier transform (FFT) module or an IFFT module. The AFE processing module is, for example, a digital-analog conversion (ADC/DAC) module or a line driver module. Making these modules stop working can greatly reduce energy consumption of a system.

Turning off analog front ends of some lines is equivalent to setting output signals of downstream precoding of the lines to zeros or setting an input signal of an upstream canceller to a zero. The setting to zeros has serious effects on a vector cancellation effect. Examples are as follows.

During normal transmission, an entire channel including a precoder is a product $Feq^k \cdot H^k \cdot P^k$ of three matrixes. The product is a unit matrix. Therefore, the crosstalk is completely canceled.

If analog end signals of some lines are suddenly turned off, it is equivalent to setting rows corresponding to the turned off lines in $P^k$ to zeros. Assuming that a set of index numbers of the turned off lines is deactive (d), a set of index numbers of lines that are not turned off is active (a), a channel after the turn off is, $$Feq^k \cdot H^k \cdot \begin{bmatrix} 0 \\ P^k_{d*} \end{bmatrix} =$$

$$Feq^k \cdot H^k \cdot P^k - Feq^k \cdot H^k \cdot \begin{bmatrix} P^k_{d*} \\ 0 \end{bmatrix} = I - Feq^k \cdot H^k \cdot \begin{bmatrix} P^k_{d*} \\ 0 \end{bmatrix},$$

where $P^k_a$ is a row that is in the precoding matrix and that corresponds to an active line, and $P^k_d$ is a row that is in the precoding matrix and that corresponds to a turned off line.

After the lines of the d set are turned off, an error (a difference relative to a unit matrix I) generated on final lines is $$Feq^k \cdot H^k \cdot \begin{bmatrix} P^k_{d*} \\ 0 \end{bmatrix}.$$

The error is not a diagonal matrix, and may generate relatively serious residual crosstalk and affect performance of all active lines.

In the prior art, one method for resolving the problem of residual crosstalk is to calculate an inverse matrix of a submatrix of an active line a according to an index of the active line. Specific implementation is as follows.

Assuming that an inverse matrix P of an entire channel matrix H is represented as $$H^{-1} = P = \begin{bmatrix} P_{aa} & P_{ad} \\ P_{da} & P_{dd} \end{bmatrix},$$

an inverse of an a-index submatrix of the H may be represented as $H_{aa}^{-1} = P_{aa} - P_{ad} P_{dd}^{-1} P_{da}$.

The precise calculation method requires inversion performed on a submatrix $P_{ad}$. A symbol rate of G.fast is 48 kilohertz (kHz), and each symbol only has 21 microseconds. Therefore, it is almost impossible to complete the inversion calculation in 21 microseconds.

Further, to avoid the inversion calculation, some similar signal compensation methods are provided in the prior art. An example is as follows.

A precise compensation theoretical formula is as follows, but the precise compensation has an inversion complexity problem, $$X_a' = H_{aa}^{-1} X_a = P_{aa} X_a - P_{ad} P_{dd}^{-1} P_{da} X_a.$$

To avoid the problem, approximation may be performed on an inversion operation of $P_{dd}$, $$P_{dd}^{-1} \approx D_{dd}^{-1}(I - B_{dd} D_{dd}^{-1}),$$

where $D_{dd}$ is a diagonal matrix that includes only a diagonal element of $P_{dd}$, and $B_{dd}$ is a matrix that includes only a non-diagonal element of $P_{dd}$ and whose diagonal is 0. $D_{dd}$ is a diagonal matrix. Therefore, inversion is merely calculating a reciprocal of the diagonal element, and requires a very small amount of calculation, and the calculation can be completed in advance. Therefore, approximate compensation using the following formula does not require a large amount of calculation, and can be basically completed.

$$X_a' = P_{aa} X_a - P_{ad} D_{dd}^{-1}(I - B_{dd} D_{dd}^{-1}) P_{da} X_a.$$

In a low-power sending state, it is required that a transceiver is turned off whenever possible in order to save power. Therefore, if a port needs to be deactivated, an analog front end of the transceiver also needs to be turned off as soon as possible.

In an existing Very-high-bit-rate digital subscriber line 2 (VDSL2) vectoring system, during deactivation, a vectoring coefficient does not need to be updated.

In a deactivation process in which a line changes from an active state L0/L2 to an L3 state, transceivers of two sides perform state switching after negotiation.

But the existing deactivation process is only applicable to a weak crosstalk scenario, that is, a scenario in which a channel matrix H is strictly diagonally dominant (a non-diagonal element of H is far less than a diagonal element). It is assumed that there are a total of m lines in a current vectoring system, among which a lines remain active and d lines are deactivated.

Therefore, before deactivation, signals of the a lines are sent using the d lines. A formula is expressed as $$X' = \begin{pmatrix} X_a' \\ X_d' \end{pmatrix} = P \cdot X = \begin{bmatrix} P_{aa} & P_{ad} \\ P_{da} & P_{dd} \end{bmatrix} \begin{pmatrix} X_a \\ X_d \end{pmatrix} = \begin{pmatrix} P_{aa} \cdot X_a & P_{ad} \cdot X_d \\ P_{da} \cdot X_a & P_{dd} \cdot X_d \end{pmatrix}.$$

After deactivation, analog front ends of the d lines are turned off, and precoded signals $X_d'$ of the d lines cannot be sent out. Therefore, some signals cannot be sent out (signals $P_{da} \cdot X_a$ refer to signals of the a lines that pass through a precoder P and are sent by d). Because the signal $P_{da} \cdot X_a$ is not sent out, crosstalk between the a lines is not completely canceled, and therefore, a performance of the a lines is decreased.

In a VDSL2 scenario, crosstalk is relatively weak, and H is strongly diagonally dominant. Therefore, P is also strongly diagonally dominant. An amplitude of $P_{da}$ is so small that the errors can be ignored. In a super high frequency DSL, crosstalk is very strong, the amplitude of $P_{da}$ is obviously increased, and the errors cannot be ignored, which causes serious performance degradation. Similarly, turning off analog ends of d may result in turning off of upstream signals and cause residual crosstalk between lines.

SUMMARY

Embodiments of the present disclosure provide a deactivation method and system in a crosstalk scenario, to resolve a problem in the prior art that deactivation of a line causes residual crosstalk of other active lines in a strong crosstalk scenario.

According to a first aspect, the present disclosure provides a deactivation method in a crosstalk scenario, where when M transceivers of a central office end send data using M lines and perform crosstalk cancellation on the M lines using a canceller, the method includes when the M transceivers are in a data transmission showtime state, if a trigger state change event is detected, switching, by N transceivers, to a deactivation execution state, to deactivate N lines among the M lines, where M and N are positive integers, and acquiring an update coefficient used to update a crosstalk cancellation coefficient between (M-N) active lines, updating the crosstalk cancellation coefficient between the (M-N) active lines using the update coefficient, and controlling the transceivers in the deactivation execution state to enter a silent or an idle state, to complete deactivation.

With reference to the first aspect, in a first possible implementation manner, the switching, by N transceivers, to a deactivation execution state, to deactivate N lines among the M lines includes turning off a downstream signal $X_a'$ that has not passed through the canceller and that corresponds to each deactivated line among the N lines, and controlling an analog front end of each transceiver among the N transceivers to continue to send a signal.

With reference to the first aspect, in a second possible implementation manner, the switching, by N transceivers, to a deactivation execution state, to deactivate N lines among the M lines includes turning off a signal $X_a'$ that has not passed through the canceller and that corresponds to each deactivated line among the N lines, and simultaneously turning off an analog front end corresponding to each deactivated line among the N lines, and performing signal compensation on cancellation signals of the (M-N) active lines to generate a cancellation output signal $X_a'$.

With reference to the first aspect, in a third possible implementation manner, the switching, by N transceivers, to a deactivation execution state includes controlling an analog front end of each transceiver among the N transceivers to continue to receive an upstream signal.

With reference to the first aspect, in a fourth possible implementation manner, the switching, by N transceivers, to a deactivation execution state, to deactivate N lines among the M lines includes turning off an analog front end of each deactivated line among the N lines and performing signal compensation on cancellation signals of the (M-N) active lines to generate a cancellation output signal $Y_a'$.

With reference to the first aspect to the fourth possible implementation manner of the first aspect, in a fifth possible implementation manner, the trigger state change event includes, in a process in which data is transmitted using the lines, a bit error quantity of the transmitted data or bit error duration exceeds a specified threshold, or a command triggering state change is detected, or line interruption or device power-off.

With reference to the fifth possible implementation manner of the first aspect, in a sixth possible implementation manner, when the trigger state change event is a deactivation event causing a change in a crosstalk channel between the lines, the crosstalk channel between the active lines is re-estimated, and the update coefficient is acquired using the re-estimated channel between the active lines.

With reference to the first aspect to the sixth possible implementation manner of the first aspect, in a seventh possible implementation manner, the acquiring an update coefficient used to update a crosstalk cancellation coefficient between active lines includes acquiring the update coefficient using the crosstalk channel before the deactivation execution state and/or the crosstalk cancellation coefficient before the deactivation execution state.

With reference to the first aspect to the seventh possible implementation manner of the first aspect, in an eighth possible implementation manner, the updating the crosstalk cancellation coefficient between the active lines using the update coefficient, and controlling the deactivated lines in the deactivation execution state to enter a non-working state includes controlling a currently deactivated transceiver of a far end to enter the silent or the idle state, updating the crosstalk cancellation coefficient between the active lines using the update coefficient, and controlling the currently deactivated transceivers of the central office end to enter the silent or the idle state.

According to a second aspect, the present disclosure further provides a deactivation system in a crosstalk scenario, where the system includes M transceivers of a central office end and a canceller, and when data is sent using M lines and crosstalk cancellation is performed on the M lines using the canceller, the system includes, when the transceivers are in a data transmission showtime state, if a trigger state change event is detected, N transceivers switch to a deactivation execution state, to deactivate N lines among the M lines, where M and N are positive integers, and the canceller acquires an update coefficient used to update a crosstalk cancellation coefficient between (M-N) active lines, updates the crosstalk cancellation coefficient between the (M-N) active lines using the update coefficient, and controls the transceivers in the deactivation execution state to enter a silent or an idle state, to complete deactivation.

With reference to the second aspect, in a first possible implementation manner of the second aspect, the transceivers turn off a downstream signal $X_d$ that has not passed through the canceller and that corresponds to each deactivated line among the N lines, control an analog front end of each transceiver among the N transceivers to continue to send a signal, and switch to the deactivation execution state.

With reference to the second aspect, in a second possible implementation manner of the second aspect, the transceivers turn off a signal $X_d$ that has not passed through the canceller and that corresponds to each deactivated line among the N lines, simultaneously turn off an analog front end corresponding to each deactivated line among the N lines, and switch to the deactivation execution state, and the canceller is further configured to perform signal compensation on cancellation signals of the (M-N) active lines to generate a cancellation output signal $X_a'$.

With reference to the second aspect, in a third possible implementation manner of the second aspect, the transceivers control an analog front end of each transceiver among the N transceivers to continue to receive an upstream signal, and switch to the deactivation execution state.

With reference to the second aspect, in a fourth possible implementation manner of the second aspect, the transceivers turn off an analog front end corresponding to each deactivated line among the N lines, and switch to the deactivation execution state, and the canceller is further configured to perform signal compensation on cancellation signals of the (M-N) active lines to generate a cancellation output signal $Y_a'$.

With reference to the second aspect to the fourth possible implementation manner of the second aspect, in a fifth possible implementation manner, the canceller is further configured to acquire the update coefficient using a crosstalk channel before the deactivation execution state and/or the crosstalk cancellation coefficient before the deactivation execution state.

One or two of the foregoing technical solutions have at least the following technical effects.

In the method and the system provided by the present disclosure, a state change of a transceiver is combined with updating of a crosstalk cancellation matrix, to avoid an effect caused by a signal of a deactivated transceiver to stability of other lines in a vector system.

A process of the state change of the transceiver is combined with a discontinuous mode. An AFE of the transceiver is turned off more quickly in the discontinuous mode to save power, and meanwhile, an effect caused by a signal of a deactivated transceiver to stability of other lines in the vector system is avoided.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by a person of common skill in the art based on the embodiments of the present disclosure without creative efforts shall fall within the protection scope of the present disclosure.

Embodiment 1

Figure 1:
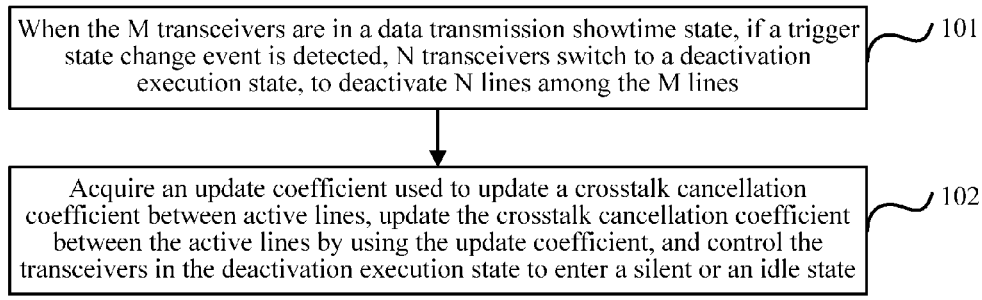
FIG. 1 is a schematic flowchart of a deactivation method in a crosstalk scenario according to Embodiment 1 of the present disclosure.

As shown in FIG. 1, the present disclosure provides a deactivation method in a crosstalk scenario, where when M transceivers of a central office end send data using M lines and perform crosstalk cancellation on the M lines using a canceller, the method includes the following steps.

Step 101: When the M transceivers are in a data transmission showtime state, if a trigger state change event is detected, N transceivers switch to a deactivation execution state, to deactivate N lines among the M lines, where M and N are positive integers.

The deactivation execution state provided in this embodiment of the present disclosure refers to a state in which a deactivation process is being executed.

The state change may be triggered when the transceiver meets a retraining rule, or may be triggered under the control of a user. Therefore, in this embodiment of the present disclosure, the state change is triggered if the trigger state change event includes any one of the following manners.

A: In a process in which data is transmitted using the lines, a bit error quantity of the transmitted data exceeds a specified threshold. For example, when detecting a serious bit error that affects normal running of a link, an office-end transceiver (TU-O) (a transceiver located on a device side) or a far-end transceiver (TU-R) (located on a user side) initiates a deactivation request.

B: A command triggering state change is detected. For example, a user issues a deactivation command by means of a command line, a network management system, or the like.

C: A disorderly shutdown event (DSE), for example, line interruption or device power-off. For example, power is switched off on a TU-R, or a user line is disconnected on any interface. This event may be detected by a TU-O, and a deactivation request is initiated.

Step 102: Acquire an update coefficient used to update a crosstalk cancellation coefficient between (M-N) active lines, update the crosstalk cancellation coefficient between the (M-N) active lines using the update coefficient, and control the transceivers in the deactivation execution state to enter a silent or an idle state, to complete deactivation.

In some deactivation scenarios (for example, a DSE or impedance matching changes after deactivation), after some lines are deactivated, a crosstalk channel between remaining lines changes. In this case, $H_{aa-new}$ needs to be re-estimated. In addition, in order not to bring unnecessary work load to a VCE, it is determined whether the deactivation causes a change in a channel between the other lines.

If the deactivation causes a change in the channel between other lines, an operation of subsequently updating the channel and re-updating a cancellation matrix is performed. Otherwise, the process is ended.

Usually, the channel changes if the deactivation is performed in a disorderly leaving event (DLE) manner. Therefore, the TU-O or the VCE may perform determining, and if the deactivation is caused by a DLE, the TU-O or the VCE needs to update the channel between the active lines, acquire $H_{aa-new}$, and update the crosstalk cancellation coefficient according to $H_{aa-new}$.

In this embodiment of the present disclosure, an optimum manner for updating the crosstalk cancellation coefficient between the active lines using the update coefficient and controlling the deactivated lines in the deactivation execution state to enter a non-working state may be controlling a currently deactivated transceiver of a far end to enter the silent or the idle state; updating the crosstalk cancellation coefficient between the active lines using the update coefficient; and controlling the currently deactivated transceivers of the central office end to enter the silent or the idle state;

Embodiment 2

Figure 2:
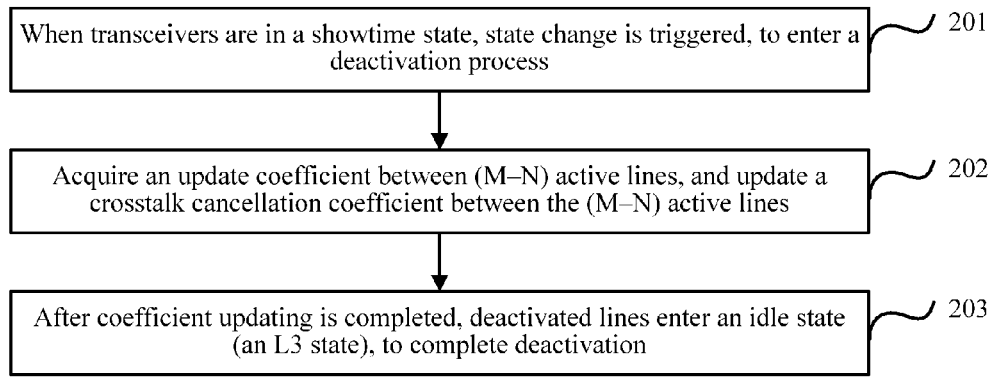
FIG. 2 is a schematic flowchart of a deactivation method in a crosstalk scenario according to Embodiment 2 of the present disclosure.

As shown in FIG. 2, when M transceivers of a central office end send data using M lines and perform crosstalk cancellation on the M lines using a canceller, the method provided by this embodiment of the present disclosure is further described in detail with reference to a specific case using the following steps.

Step 201: When transceivers are in a showtime state, state change is triggered, to enter a deactivation process, where the deactivation process is further deactivating N lines among the M lines.

Step 202: Acquire an update coefficient between (M-N) active lines, and update a crosstalk cancellation coefficient (a vector coefficient) between the (M-N) active lines using the update coefficient.

The updating a crosstalk cancellation coefficient between the (M-N) active lines refers to updating a crosstalk cancellation coefficient between each two of the (M-N) active lines. For example, there are originally ten lines, two lines are deactivated, and eight lines are left. The updated coefficient is a 8*8 matrix P. P12 is a coefficient of 2 to 1, P13 is a coefficient of 3 to 1, P21 is a coefficient of 1 to 2, and P23 is a coefficient of 3 to 2.

Step 203: After the coefficient is updated, deactivated lines enter an idle state (an L3 state), to complete deactivation.

Certainly, during specific implementation, a sequence between step 202 and step 203 may be reversed. Transceivers may be set to a silent or an idle state, and then the coefficient is updated.

In this embodiment of the present disclosure, calculation of the update coefficient is performed by a VCE. The deactivated lines enter the idle state only after the transceivers acquire the coefficient already updated by the VCE.

When a deactivation request is initiated, the VCE may be in a busy state (for example, current coefficient updating is not finished). In this case, the VCE may implement coefficient updating in one of the following processing manners.

(1) Refuse a deactivation request of a transceiver. In this case, the transceiver returns to an L0 state, or is in a special deactivating state.

(2) The VCE delays responding to a request of a transceiver, performs a coefficient updating operation according to the request of the transceiver after processing a current task, and notifies the transceiver after completing the operation. When waiting for the VCE to respond to the deactivation request, the transceiver keeps waiting in a deactivation process.

The VCE may acquire the update coefficient in multiple manners. The update coefficient may be acquired using a crosstalk channel before a deactivation execution state and/or the crosstalk cancellation coefficient before the deactivation execution state. A specific implementation manner may be any one of the following manners.

Method 1: The update coefficient is acquired using an H matrix before deactivation.

The H matrix before deactivation may be represented as $$H = \begin{bmatrix} H_{aa} & H_{ad} \\ H_{da} & H_{dd} \end{bmatrix}.$$

A cancellation matrix $P_{aa\text{-}new}$ (the update coefficient) between the corresponding (M-N) active lines may be obtained using a formula $P_{aa\text{-}new} = H_{aa}^{-1}$.

Method 2: The update coefficient is acquired using a P matrix before deactivation.

The complete P matrix before deactivation may be represented as $$P = \begin{bmatrix} P_{aa} & P_{ad} \\ P_{da} & P_{dd} \end{bmatrix}.$$

A cancellation matrix $P_{aa\text{-}new}$ between the corresponding (M-N) active lines may be obtained using a formula $P_{aa\text{-}new} = P_{aa} - P_{ad} P_{dd}^{-1} P_{da}$.

Method 3: The update coefficient is acquired using an H matrix and a P matrix before deactivation.

A cancellation matrix $P_{aa\text{-}new}$ between the (M-N) active lines may be obtained using a formula: $P_{aa\text{-}new} = P_{aa} + P_{aa} \cdot H_{ad} (I - P_{da} P_{aa})^{-1} \cdot P_{da}$, where I is a unit matrix.

Method 4: In some deactivation scenarios (for example, a DSE or impedance matching changes after deactivation), after some lines are deactivated, a channel between remaining lines changes. In this case, $H_{aa\text{-}new}$ needs to be re-estimated. An H matrix between the active lines is re-estimated, and the update coefficient is acquired using the new estimated matrix.

When the trigger state change event is a deactivation event causing a change in a channel between the central office end and the far end, the crosstalk channel between the active lines is re-estimated, and the update coefficient is acquired using the re-estimated channel between the active lines.

The VCE instructs the active lines to collect a new error sample, and estimates a new channel $H_{aa\text{-}new}$ using the new error sample. Then performs inversion on the $H_{aa\text{-}new}$, to obtain $P_{aa\text{-}new}$ or $W_{aa\text{-}new}$, and obtains a cancellation matrix $P_{aa\text{-}new}$ between the (M-N) active lines using a formula $P_{aa\text{-}new} = H_{aa\text{-}new}^{-1}$.

In each of the foregoing manners for acquiring the update coefficient, a downstream crosstalk cancellation matrix P is used as an example. In a specific application, the principle of updating an upstream crosstalk cancellation matrix $W_{aa\text{-}new}$ is the same as that of updating a downstream crosstalk cancellation matrix. Therefore, details are not described herein again.

To describe the method provided by this embodiment of the present disclosure in more detail, the method of the present disclosure is described below in detail from aspects of upstream implementation, downstream implementation, energy-saving and non-energy-saving manners.

Embodiment 3

Figure 3:
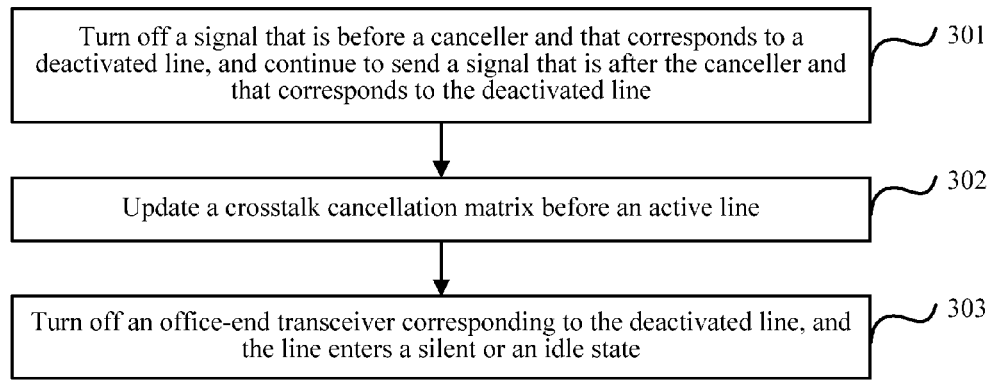
FIG. 3 is a schematic flowchart of a first method of a deactivation method in a crosstalk scenario in a downstream direction according to Embodiment 3 of the present disclosure.

As shown in FIG. 3, first specific implementation of the method provided by this embodiment of the present disclosure in a deactivation process and in a downstream direction may be as follows.

The switching, by N transceivers, to a deactivation execution state, to deactivate N lines among the M lines includes turning off a downstream signal $X_d$ that has not passed through the canceller and that corresponds to each deactivated line among the N lines, and controlling an analog front end of each transceiver among the N transceivers to continue to send a signal.

Specific execution steps of the N transceivers are the same. Therefore, in the following implementation steps, a single transceiver is used as an example to describe the method of the present disclosure.

Step 301: Turn off a signal $X_d$ ($X_d$ is 0) that has not passed through a canceller and that corresponds to a deactivated line, and continue to send a signal $X_d'$ that has passed through the canceller and that corresponds to the deactivated line. If sending of $X_d'$ needs to be continued, an AFE corresponding to the deactivated line needs to remain on.

Step 302: Update a crosstalk cancellation matrix $P_{aa\text{-}new}$ before an active line.

Step 303: Turn off a TU-O corresponding to the deactivated line such that the TU-O changes into a silent or an idle state. Because both $X_d$ and $X_d'$ are turned off, in this case, $X_d$ and $X_d'$ are both 0, execution of the deactivation process is completed, and the line enters an idle state (an L3 state).

Embodiment 4

Figure 4:
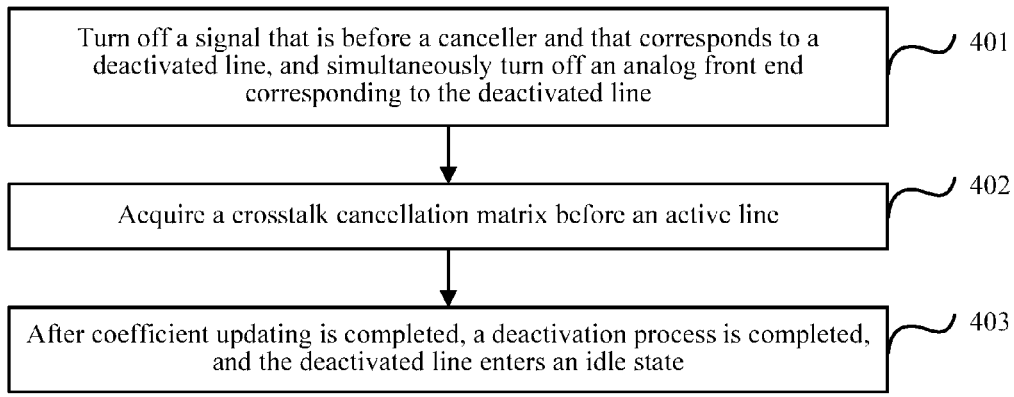
FIG. 4 is a schematic flowchart of a second method of a deactivation method in a crosstalk scenario in a downstream direction according to Embodiment 4 of the present disclosure.

As shown in FIG. 4, second specific implementation of the method provided by this embodiment of the present disclosure in a deactivation process and in a downstream direction may be as follows.

Embodiment 3 requires that the AFE of the deactivated line remains on. Therefore, energy consumption during the entire deactivation process is relatively high. To reduce energy consumption during the deactivation process, the following method may be used. The switching, by N transceivers, to a deactivation execution state, to deactivate N lines among the M lines includes turning off a signal $X_d$ that has not passed through a canceller and that corresponds to each deactivated line among the N lines, and simultaneously turning off an analog front end corresponding to each deactivated line among the N lines, and performing signal compensation on cancellation signals of the (M-N) active lines to generate a cancellation output signal $X_a{}'$. Specific implementation includes the following steps.

Step 401: Turn off a signal $X_d$ that has not passed through a canceller and that corresponds to a deactivated line, and simultaneously turn off an analog front end corresponding to the deactivated line. After the analog front end is turned off, a signal $X_d{}'$ after cancellation cannot be sent out either, and $X_d$ and $X_d{}'$ are both 0.

In this case, to avoid errors of the cancellation signals of the remaining lines, compensation needs to be performed on $X_a{}'$. There are many compensation methods, and the compensation method described in the background may be used. $X_a{}'$ may be compensated using a formula $X'_a = P_{aa}X_a - P_{ad}D_{dd}{}^{-1}(I - B_{dd}D_{dd}{}^{-1})P_{da}X_a$ and according to a serial number of the deactivated line.

Step 402: Acquire a crosstalk cancellation matrix $P_{aa\text{-}new}$ before an active line.

Step 403: After coefficient updating is completed, a deactivation process is completed, and the deactivated line enters an idle state (an L3 state).

Embodiment 5

Figure 5:
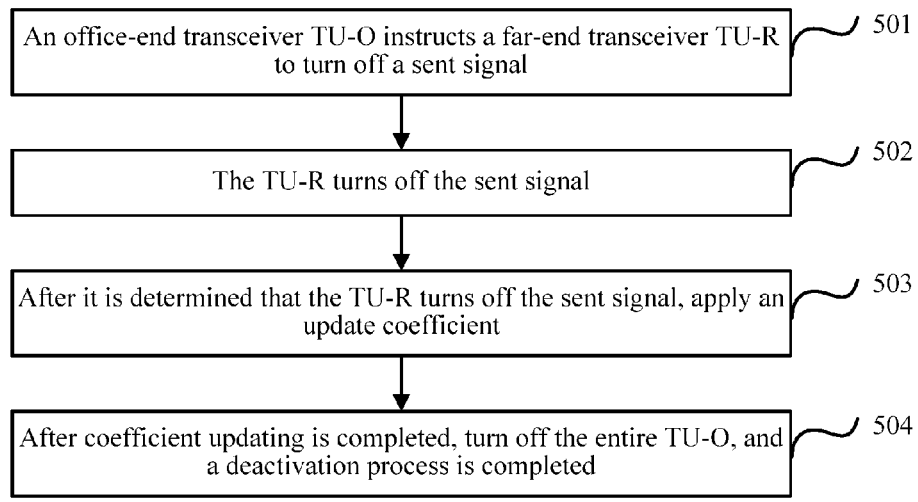
FIG. 5 is a schematic flowchart of a first method of a deactivation method in a crosstalk scenario in an upstream direction according to Embodiment 5 of the present disclosure.

As shown in FIG. 5, first specific implementation of the method provided by this embodiment of the present disclosure in a deactivation process and in an upstream direction may be as follows.

The switching, by N transceivers, to a deactivation execution state includes: controlling an analog front end of each transceiver among the N transceivers to continue to receive an upstream signal.

Step 501: A TU-O instructs a TU-R to turn off a sent signal.

Step 502: The TU-R turns off the sent signal.

Step 503: After it is determined that the TU-R turns off the sent signal, apply an update coefficient $W_{aa\text{-}new}$ (that is, a crosstalk cancellation coefficient between the (M-N) active lines is updated using the update coefficient $W_{aa\text{-}new}$).

In this embodiment of the present disclosure, any one of the following manners may be used to determine that the TU-R turns off the sent signal.

A: After receiving a turn-off command, the TU-R responds to the TU-O by sending a message, and turns off the sent signal at a determined time point after the message. After receiving the turn-off response from the TU-R, the TU-O determines the turn-off time when the TU-R turns off the sent signal.

B: After receiving the turn-off command, the TU-R directly turns off the signal. The TU-O starts signal detection, and if it is found that a signal sent by the TU-R disappears, it may be determined that the TU-R turns off the sent signal.

There is another special case, that is, a DSE. Because the TU-R is powered off or a subscriber line is disconnected, the TU-O cannot communicate with the TU-R. In this case, in an upstream deactivation process, it is directly determined that the TU-R turns off the sent signal. The TU-O determines through detection that the TU-R is off, and subsequent steps are performed.

Step 504: After coefficient updating is completed, turn off the entire TU-O, and a deactivation process is completed.

Embodiment 6

Figure 6:
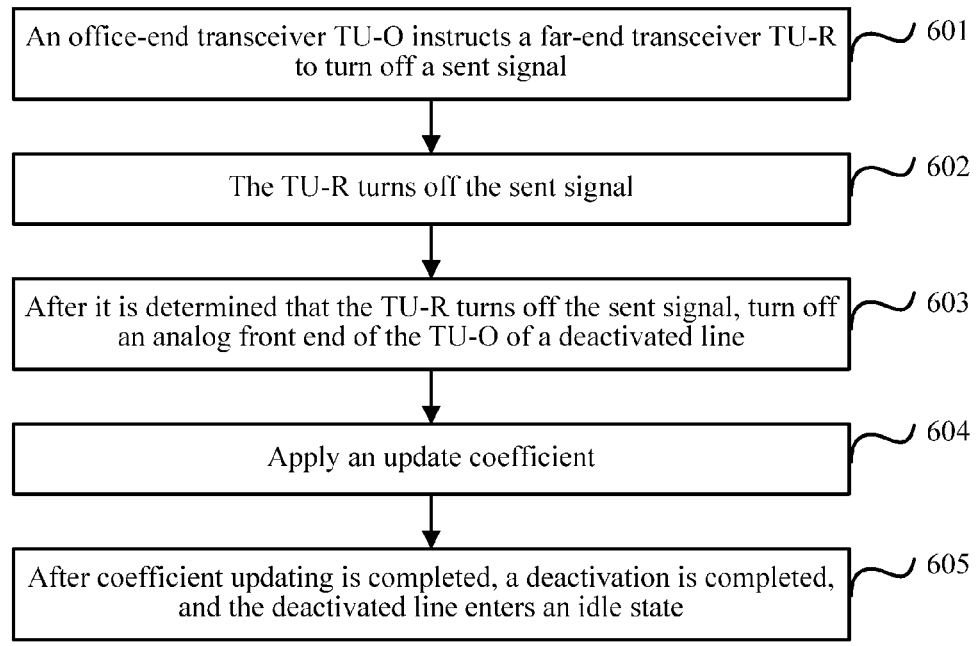
FIG. 6 is a schematic flowchart of a second method of a deactivation method in a crosstalk scenario in an upstream direction according to Embodiment 6 of the present disclosure.

As shown in FIG. 6, second specific implementation of the method provided by this embodiment of the present disclosure in a deactivation process and in an upstream direction may be as follows.

The switching, by N transceivers, to a deactivation execution state, to deactivate N lines among the M lines includes turning off an analog front end of each deactivated line among the N lines, and performing signal compensation on cancellation signals of the (M-N) active lines to generate a cancellation output signal $Y_a{}'$.

In the method provided by the foregoing Embodiment 5, the lines can be turned off only after coefficient updating is completed, which is not good for energy saving. The method of this embodiment provides an energy-saving manner. Specific implementation include the following steps.

Step 601: A TU-O instructs a TU-R to turn off a sent signal.

Step 602: The TU-R turns off the sent signal.

Step 603: After it is determined that the TU-R turns off the sent signal, turn off an AFE of the TU-O of a deactivated line.

In this case, because the AFE is turned off, signals $Y_d$, which enter a canceller, of the deactivated line already cannot be acquired, and are all 0. Therefore, when the AFE of the TU-O is turned off, compensation needs to be performed on a signal $Y'_a$ of an active line after cancellation, to avoid crosstalk between remaining lines.

There may be many compensation methods, and the compensation method described in the background may be used. $Y'_a$ may be compensated using a formula $Y'_a = W_{aa}Y_a - W_{ad}D^{-1}{}_{dd}(I - B_{dd}D_{dd}{}^{-1})W_{da}Y_a$ and according to a serial number of the deactivated line.

Step 604: Apply an update coefficient $W_{aa\text{-}new}$ (that is, a crosstalk cancellation coefficient between the (M-N) active lines is updated using the update coefficient $W_{aa\text{-}new}$).

Step 605: After coefficient updating is completed, a deactivation process is completed, and the deactivated line enters an L3 (idle) state.

Figure 7:
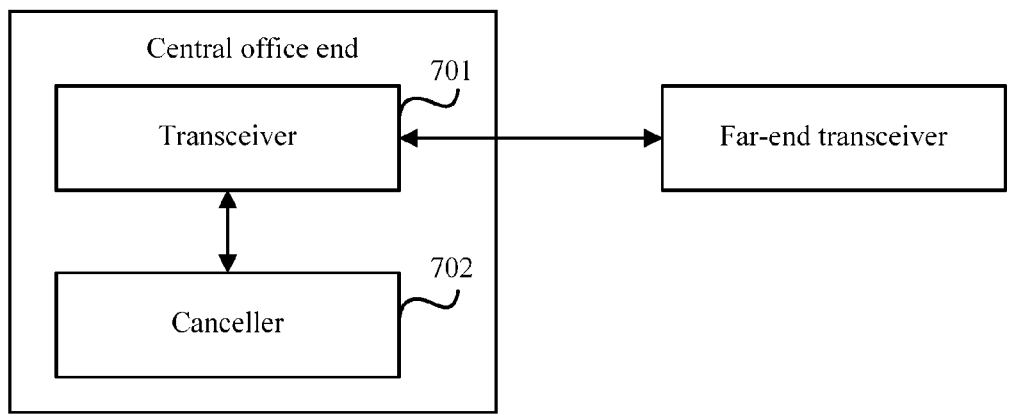
FIG. 7 is a schematic structural diagram of a deactivation system in a crosstalk scenario according to an embodiment of the present disclosure.

As shown in FIG. 7, the present disclosure further provides a deactivation system in a crosstalk scenario according to the foregoing method, where the system includes M transceivers of a central office end and a canceller, and when data is sent using M lines and crosstalk cancellation is performed on the M lines using the canceller, the system includes, when the transceivers 701 are in a data transmission showtime state, if a trigger state change event is detected, N transceivers switch to a deactivation execution state, to deactivate N lines among the M lines, where M and N are positive integers, and the canceller 702 acquires an update coefficient used to update a crosstalk cancellation coefficient between (M-N) active lines, updates the crosstalk cancellation coefficient between the (M-N) active lines using the update coefficient, and controls the transceivers in the deactivation execution state to enter a silent or an idle state, to complete deactivation.

The canceller 702 is further configured to acquire the update coefficient using a crosstalk channel before the deactivation execution state and/or the crosstalk cancellation coefficient before the deactivation execution state.

In the system provided by this embodiment of the present disclosure, in a deactivation process and in a downstream direction, the transceivers may further switch to the deactivation execution state in the following two manners.

Manner 1: A downstream common mode.

The transceivers 701 turn off a downstream signal $X_d$ that has not passed through the canceller and that corresponds to each deactivated line among the N lines, control an analog front end of each transceiver among the N transceivers to continue to send a signal, and switch to the deactivation execution state.

Manner 2: A downstream energy-saving mode.

The transceivers 701 turn off a signal $X_d$ that has not passed through the canceller and that corresponds to each deactivated line among the N lines, simultaneously turn off an analog front end corresponding to each deactivated line among the N lines, and switch to the deactivation execution state, and the canceller 702 is further configured to perform signal compensation on cancellation signals of the (M-N) active lines to generate a cancellation output signal $X_a'$.

In the system provided by this embodiment of the present disclosure, in a deactivation process and in an upstream direction, the transceivers may further switch to the deactivation execution state in the following two manners.

Manner 1: An upstream common mode.

The transceivers 701 control an analog front end of each transceiver among the N transceivers to continue to receive an upstream signal, and switch to the deactivation execution state.

Manner 2: An upstream energy-saving mode.

The transceivers 701 turn off an analog front end of each deactivated line among the N lines, and switch to the deactivation execution state, and the canceller 702 is further configured to perform signal compensation on cancellation signals of the (M-N) active lines to generate a cancellation output signal $Y_a'$.

One or more of the foregoing technical solutions of the embodiments of this application have at least the following technical effects.

In the method and the system provided by the present disclosure, a state change of a transceiver is combined with updating of a crosstalk cancellation matrix, to avoid an effect caused by a signal of a deactivated transceiver to stability of other lines in a vector system.

A process of the state change of the transceiver is combined with a discontinuous mode. An AFE of the transceiver is turned off more quickly in the discontinuous mode to save power, and meanwhile, an effect caused by a signal of a deactivated transceiver to stability of other lines in a vector system is avoided.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or a part of the technical solutions may be implemented in the form of a software product. The software product is stored in a storage medium and includes several instructions for controlling a computer device (which may be a personal computer, a server, or a network device) or a processor to perform all or a part of the steps of the methods described in the embodiments of the present application. The foregoing storage medium includes any medium that can store program code, such as a universal serial bus (USB) flash drive, a removable hard disk, a read-only memory (ROM), a random access memory (RAM), a magnetic disk, or an optical disc.

The foregoing embodiments are merely used to describe the technical solutions of the present application. The foregoing embodiments are merely intended to help understand the method and core idea of the present disclosure, and shall not be construed as a limitation on the present disclosure. Any variation or replacement readily figured out by a person skilled in the art within the technical scope disclosed in the present disclosure shall fall within the protection scope of the present disclosure.

What is claimed is:

1. A deactivation method in a crosstalk scenario, wherein M transceivers of a central office end send data using M lines and perform crosstalk cancellation on the M lines using a canceller, and wherein the method comprises:

switching, by N transceivers, to a deactivation execution state to deactivate N lines among the M lines when the M transceivers are in a data transmission showtime state and when a trigger state change event is detected, wherein M and N are positive integers;

acquiring an update coefficient used to update a crosstalk cancellation coefficient between (M-N) active lines;

updating the crosstalk cancellation coefficient between the (M-N) active lines using the update coefficient; and controlling the N transceivers in the deactivation execution state to enter a silent or an idle state, wherein switching, by N transceivers, to the deactivation execution state, to deactivate N lines among the M lines comprises:

turning off a downstream signal $X_d$ that has not passed through the canceller and that corresponds to each deactivating line among the N lines; and controlling an analog front end of each transceiver among the N transceivers to continue to send a signal.

2. The method according to claim 1, wherein switching, by N transceivers, to the deactivation execution state comprises controlling an analog front end of each transceiver among the N transceivers to continue to receive an upstream signal.

3. The method according to claim 1, wherein switching, by N transceivers, to the deactivation execution state, to deactivate N lines among the M lines comprises:

turning off an analog front end of each deactivating line among the N lines; and performing signal compensation on cancellation signals of the (M-N) active lines to generate a cancellation output signal $Y_a'$.

4. The method according to claim 1, wherein the trigger state change event comprises a bit error quantity of transmitted data exceeds a specified threshold when data is transmitted using the (M-N) active lines.

5. The method according to claim 4, wherein when the trigger state change event is a deactivation event causing a change in a crosstalk channel between the (M-N) active lines, the crosstalk channel between the (M-N) active lines is re-estimated, and wherein the update coefficient is acquired using the re-estimated channel between the (M-N) active lines.

6. The method according to claim 1, wherein acquiring the update coefficient used to update the crosstalk cancellation coefficient between the (M-N) active lines comprises acquiring the update coefficient using a crosstalk channel before the deactivation execution state and the crosstalk cancellation coefficient before the deactivation execution state.

7. The method according to claim 1, wherein acquiring the update coefficient used to update the crosstalk cancellation coefficient between the (M-N) active lines comprises acquiring the update coefficient using a crosstalk channel before the deactivation execution state.

8. The method according to claim 1, wherein acquiring the update coefficient used to update the crosstalk cancellation coefficient between the (M-N) active lines comprises acquiring the update coefficient using the crosstalk cancellation coefficient before the deactivation execution state.

9. The method according to claim 1, wherein updating the crosstalk cancellation coefficient between the (M-N) active lines using the update coefficient, and wherein controlling the deactivating lines in the deactivation execution state to enter a non-working state comprises:

controlling a currently deactivating transceiver of a far end to enter the silent or the idle state;

updating the crosstalk cancellation coefficient between the (M-N) active lines using the update coefficient; and controlling the currently deactivating transceivers of the central office end to enter the silent or the idle state.

10. The method according to claim 1, wherein the trigger state change event comprises a bit error duration exceeds a specified threshold when data is transmitted using the (M-N) active lines.

11. The method according to claim 1, wherein the trigger state change event comprises a command triggering state change is detected.

12. The method according to claim 1, wherein the trigger state change event comprises a line interruption.

13. The method according to claim 1, wherein the trigger state change event comprises a device power-off.

14. A deactivation system in a crosstalk scenario, comprising:

M transceivers of a central office end; and a canceller coupled to the M transceivers of the central office end and configured to perform crosstalk cancellation on M lines when data is sent using the M lines, wherein N transceivers are configured to switch to a deactivation execution state to deactivate N lines among the M lines when the M transceivers of the central office end are in a data transmission showtime state and when a trigger state change event is detected, wherein M and N are positive integers, wherein the canceller is further configured to:

acquire an update coefficient used to update a crosstalk cancellation coefficient between (M-N) active lines;

update the crosstalk cancellation coefficient between the (M-N) active lines using the update coefficient; and control the N transceivers in the deactivation execution state to enter a silent or an idle state, and wherein the N transceivers are further configured to:

turn off a downstream signal $X_d$ that has not passed through the canceller and corresponds to each deactivating line among the N lines;

control an analog front end of each transceiver among the N transceivers to continue to send a signal; and switch to the deactivation execution state.

15. The system according to claim 14, wherein the N transceivers are further configured to:

control an analog front end of each transceiver among the N transceivers to continue to receive an upstream signal; and switch to the deactivation execution state.

16. The system according to claim 14, wherein the N transceivers are further configured to:

turn off an analog front end corresponding to each deactivating line among the N lines; and switch to the deactivation execution state, and wherein the canceller is further configured to perform signal compensation on cancellation signals of the (M-N) active lines to generate a cancellation output signal $Y_n'$.

17. The system according to claim 14, wherein the canceller is further configured to acquire the update coefficient using a crosstalk channel before the deactivation execution state and the crosstalk cancellation coefficient before the deactivation execution state.

18. The system according to claim 14, wherein the canceller is further configured to acquire the update coefficient using a crosstalk channel before the deactivation execution state.

19. The system according to claim 14, wherein the canceller is further configured to acquire the update coefficient using the crosstalk cancellation coefficient before the deactivation execution state.

20. A deactivation method in a crosstalk scenario, wherein M transceivers of a central office end send data using M lines and perform crosstalk cancellation on the M lines using a canceller, and wherein the method comprises:

switching, by N transceivers, to a deactivation execution state to deactivate N lines among the M lines when the M transceivers are in a data transmission showtime state and when a trigger state change event is detected, wherein M and N are positive integers;

acquiring an update coefficient used to update a crosstalk cancellation coefficient between (M-N) active lines;

updating the crosstalk cancellation coefficient between the (M-N) active lines using the update coefficient; and controlling the N transceivers in the deactivation execution state to enter a silent or an idle state, wherein switching, by N transceivers, to the deactivation execution state, to deactivate N lines among the M lines comprises:

turning off a signal $X^d$ that has not passed through the canceller and that corresponds to each deactivating line among the N lines, simultaneously turning off an analog front end corresponding to each deactivating line among the N lines; and performing signal compensation on cancellation signals of the (M-N) active lines to generate a cancellation output signal $X_a'$.

21. A deactivation system in a crosstalk scenario, comprising:

M transceivers of a central office end; and a canceller coupled to the M transceivers of the central office end and configured to perform crosstalk cancellation on M lines when data is sent using the M lines, wherein N transceivers are configured to switch to a deactivation execution state to deactivate N lines among the M lines when the M transceivers of the central office end are in a data transmission showtime state and when a trigger state change event is detected, wherein M and N are positive integers, wherein the canceller is further configured to:
acquire an update coefficient used to update a crosstalk cancellation coefficient between (M-N) active lines;
update the crosstalk cancellation coefficient between the (M-N) active lines using the update coefficient; and
control the N transceivers in the deactivation execution state to enter a silent or an idle state, and wherein the N transceivers are further configured to:
turn off a signal $X_d$ that has not passed through the canceller and that corresponds to each deactivating line among the N lines;
simultaneously turn off an analog front end corresponding to each deactivating line among the N lines; and
switch to the deactivation execution state, and wherein the canceller is further configured to perform signal compensation on cancellation signals of the (M-N) active lines to generate a cancellation output signal $X_a'$.

* * * * *

UNITED STATES PATENT AND TRADEMARK OFFICE
CERTIFICATE OF CORRECTION

PATENT NO. : 9,973,236 B2
APPLICATION NO. : 15/073030
DATED : May 15, 2018
INVENTOR(S) : Lv et al.

Page 1 of 1

It is certified that error appears in the above-identified patent and that said Letters Patent is hereby corrected as shown below:

Column 16; Line 48; Claim 16 should read:
signal Y_a

Signed and Sealed this
Tenth Day of July, 2018

Andrei Iancu
*Director of the United States Patent and Trademark Office*